United States Patent
Lin et al.

(10) Patent No.: US 9,344,250 B2
(45) Date of Patent: May 17, 2016

(54) METHOD, SYSTEM, BASE STATION AND TERMINAL FOR SENDING MULTIPOINT TRANSMISSION SYSTEM DATA

(75) Inventors: Shugong Lin, Shenzhen (CN); Junqiang Liu, Shenzhen (CN); Yunliang Geng, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 113 days.

(21) Appl. No.: 14/342,427

(22) PCT Filed: Jun. 28, 2012

(86) PCT No.: PCT/CN2012/077704
§ 371 (c)(1),
(2), (4) Date: Mar. 3, 2014

(87) PCT Pub. No.: WO2013/034017
PCT Pub. Date: Mar. 14, 2013

(65) Prior Publication Data
US 2014/0219259 A1    Aug. 7, 2014

(30) Foreign Application Priority Data
Sep. 5, 2011   (CN) .......................... 2011 1 0261120

(51) Int. Cl.
*H04L 5/00*   (2006.01)
*H04W 56/00*  (2009.01)
(Continued)

(52) U.S. Cl.
CPC ............. *H04L 5/0053* (2013.01); *H04W 56/00* (2013.01); *H04L 1/0026* (2013.01); *H04L 1/1671* (2013.01)

(58) Field of Classification Search
CPC ... H04L 5/0053; H04L 1/0026; H04L 1/1671; H04W 56/00

USPC ......... 370/241, 252, 310, 315, 316, 319, 321, 370/324, 328, 329, 336, 345, 350, 464, 498, 370/503, 507, 509, 510, 512
See application file for complete search history.

(56) References Cited

U.S. PATENT DOCUMENTS

| 2008/0069020 A1* | 3/2008 | Richardson .................... 370/311 |
| 2012/0069798 A1* | 3/2012 | Vitthaladevuni et al. ..... 370/328 |

(Continued)

FOREIGN PATENT DOCUMENTS

| CN | 1437803 A    | 8/2003  |
| CN | 101304606 A  | 11/2008 |

(Continued)

OTHER PUBLICATIONS

International Search Report for PCT/CN2012/077704 dated Sep. 14, 2012.

(Continued)

*Primary Examiner* — Obaidul Huq
(74) *Attorney, Agent, or Firm* — Ling Wu; Stephen Yang; Ling and Yang Intellectual Property

(57) ABSTRACT

The present document provides a method, a multi-point transmission system, a base station and a terminal for transmitting data in a multi-point transmission system. The method includes: for a User Equipment (UE) enabling multi-point transmission, a base station to which a secondary serving cell of the UE belongs adjusting a time when a High Speed Shared Control Channel (HS-SCCH) and a High Speed Dedicated Physical Control Channel (HS-PDSCH) are transmitted to the UE according to frame offset information of the primary and secondary serving cells of the UE, so that a subframe boundary offset between the HS-PDSCHs of the primary and secondary serving cells received by the UE is within a specified range, and a subframe boundary offset between the HS-SCCHs of the primary and secondary serving cells received by the UE is within the same specified range.

15 Claims, 11 Drawing Sheets

(51) Int. Cl.
*H04L 1/00* (2006.01)
*H04L 1/16* (2006.01)

(56) References Cited

U.S. PATENT DOCUMENTS

2013/0028117 A1* 1/2013 Montojo et al. .............. 370/252
2013/0272221 A1* 10/2013 Hoehne et al. ................ 370/329

FOREIGN PATENT DOCUMENTS

| CN | 101431808 A | 5/2009 |
| WO | 2011025434 A1 | 3/2011 |

OTHER PUBLICATIONS

3GPP TS 25.211. 3rd Generation Partnership Project; Technical Specification Group Radio Access Network; Physical channels and mapping of transport channels onto physical channels(FDD); Release 9; Sep. 2010.

3GPP TSG RAN WG1 Meeting #66, TP on Impact to RAN specifications due to HSDPA MP-Tx, QUALCOMM Incorporated; Athens, Greece, Aug. 22-26, 2011, R1-112688.

3GPP TSG RAN WG1 Meeting #61-bis,On deploying DC-HSDPA UEs in Single Frequency Networks, QUALCOMM Incorporated; Dresden, Germany,Jun. 29-Jul. 2, 2010; R1-104157.

* cited by examiner

US 9,344,250 B2

METHOD, SYSTEM, BASE STATION AND TERMINAL FOR SENDING MULTIPOINT TRANSMISSION SYSTEM DATA

TECHNICAL FIELD

The present document relates to multi-point transmission technologies in a mobile communication system, and in particular, to a method, a system, a base station and a terminal for transmitting data in a multi-point transmission system.

BACKGROUND OF THE RELATED ART

High Speed Downlink Link Packet Access (HSDPA) is a technique proposed by the $3^{rd}$ Generation Partnership Project (3GPP) in Release-5, which is used to improve network data throughput in the downlink direction (from the network to the terminal), and the cell and the single user downlink peak rate designed by it can reach 14.4 Mbps. Then, in order to make the downlink peak rate higher, a new technology HSPA+ is introduced, these technologies include the DL 64QAM high-order modulation and Multiple Input Multiple Output (MIMO) antenna technology proposed in Release-7, the Multi-carrier DC HSDPA technology proposed in the Release-8, the DC HSDPA+MIMO technology proposed in the Release-9, and the 4C HSDPA technology proposed in the Release-10. But because the HSDPA does not support soft handover, in order to improve the user experience on the cell edge, the Release-11 starts to do research on the multi-point transmission technology for WCDMA HSDPA. One multi-point transmission technology scheme therein is Single Frequency Dual Cell (SF-DC), which includes dual-data stream transmission scheme SF-DC Aggregation and single-data stream transmission scheme SF-DC Switching. The SF-DC Aggregation is to make two co-frequency cells (referred to as a primary serving cell and a secondary serving cell) using the HSDPA technology under the same base station (NodeB) or different NodeBs transmit different data streams to the same User Equipment (UE) in the same Transmission Time Interval (TTI), thereby increasing the data throughput when the user is at the cell edge. The SF-DC Switching is to select a cell with better signal from both co-frequency cells (referred to as a primary serving cell and a secondary serving cell) under the same NodeB to transmit a data stream to the UE. The SF-DC technology requires a user enabling the SF-DC transmission to monitor High Speed Shared Control Channels (HS-SCCH) of two co-frequency primary and secondary serving cells simultaneously, and feeds back jointly encoded Acknowledgement/Negative Acknowledgement (ACK/NACK) indication and Channel Quality Indicator (CQI) in the uplink direction of both co-frequency primary and secondary serving cells, wherein, the indication is transmitted on the High Speed Dedicated Physical Control Channel (HS-DPCCH). At present, the 3GPP 25.211 protocol specifies occasions when the UE transmits the HS-DPCCH, that is, the HS-DPCCH channel is started to be transmitted after about 7.5 slots after the UE receives the High-Speed Physical Downlink Shared Channel (HS-PDSCH). As shown in FIGS. 1 and 2, since in the SF-DC system, there exists a frame offset in the primary and secondary serving cells and the air transmission delays of both cells are different, it results in different times when the UE receives the HS-PDSCH channel from the primary and secondary serving cells respectively. If the specification of the existing protocol is followed, the UE can not transmit the jointly encoded ACK/NACK and CQI indication to the primary and secondary serving cells with different frame offsets at the same time. In order to enable the UE to transmit the ACK/NACK and CQI indication to both the primary and secondary serving cells of the SF-DC at the same time, the current 3GPP is investigating several schemes: the first scheme is to compress the time during with which the UE transmits the HS-DPCCH, that is, the UE can transmit the HS-DPCCH channel about 4.5 slots-7.5 slots after receiving the HS-PDSCH channel, as shown in FIG. 3; the second scheme is to compress the time during with which the NodeB decodes and processes the HS-DPCCH, as shown in FIG. 4; and the third scheme is to equalize and compress the time during with which the UE transmits the HS-DPCCH and compress the time during with which the UE decodes and processes the HS-DPCCH, as shown in FIG. 5. All these schemes can solve the problem of the UE transmitting the HS-DPCCH in the SF-DC system, but make significant modifications to the hardware of the terminal or the base station, which increases the implementation cost. If the first scheme or the third scheme is used, there will also have a relatively large influence on the specification.

SUMMARY OF THE INVENTION

The technical problem to be solved by the embodiments of the present document is to provide a method, a multi-point transmission system, a base station and a terminal for transmitting data in a multi-point transmission system, so as to reduce the complexity of the design of the network system and the terminal, especially reduce the implementation cost of the network system and the terminal.

In order to solve the above problem, the embodiments of the present document use the following technical schemes:

A method for transmitting data in a multi-point transmission system, comprises:

for a User Equipment (UE) enabling multi-point transmission, a base station to which a secondary serving cell of the UE belongs adjusting a time when a High Speed Shared Control Channel (HS-SCCH) and a High Speed Dedicated Physical Control Channel (HS-PDSCH) are transmitted to the UE according to frame offset information of primary and secondary serving cells of the UE, so that a subframe boundary offset between the HS-PDSCHs of the primary and secondary serving cells received by the UE is within a specified range, and a subframe boundary offset between the HS-SCCHs of the primary and secondary serving cells received by the UE is within the same specified range.

Alternatively, the frame offset information includes a frame offset between the primary and secondary serving cells; and the frame offset between the primary and secondary serving cells is a time difference value between even frames of the Primary Common Control Physical Channels (P-CCPCH) of the primary and secondary serving cells received by the UE; or a time difference value between odd frames of the P-CCPCHs of the primary and secondary serving cells received by the UE.

Alternatively, the step of adjusting a time when an HS-SCCH and an HS-PDSCH are transmitted to the UE comprises:

obtaining transmission delay values of the HS-SCCH and the HS-PDSCH by the following mode:

when a frame timing of the secondary serving cell is later than that of the primary serving cell, the transmission delay values of the HS-SCCH and the HS-PDSCH being: (a length of one HS-PDSCH subframe–the frame offset between the primary and secondary serving cells of the UE mod a length of the HS-PDSCH subframe)–((the length of one HS-PDSCH subframe–the frame offset between the primary and secondary serving cells of the UE mod the length of the HS-PDSCH subframe)mod 256); and when the frame timing of the secondary serving cell is earlier than that of the primary serving cell, the transmission delay values of the HS-SCCH and the HS-PDSCH being: the frame offset between the primary and secondary serving cells of the UE mod the length of the HS-PDSCH subframe−((the frame offset between the primary and secondary serving cells of the UE mod the length of the HS-PDSCH subframe)mod 256).

Alternatively, the frame offset information includes a frame relative offset;

the frame relative offset is a value obtained by the frame offset between the primary and secondary serving cells of the UE mod the length of the HS-PDSCH subframe; or is the length of one HS-PDSCH subframe−(the frame offset between the primary and secondary serving cells of the UE mod the length of one HS-PDSCH subframe);

the frame offset between the primary and secondary serving cells is a time difference value between even frames of the P-CCPCHs of the primary and secondary serving cells received by the UE; or is a time difference value between odd frames of the P-CCPCHs of the primary and secondary serving cells received by the UE.

Alternatively, the step of adjusting a time when an HS-SCCH and an HS-PDSCH are transmitted to the UE comprises:

obtaining the transmission delay values of the HS-SCCH and the HS-PDSCH by the following mode:

when the frame timing of the secondary serving cell is later than that of the primary serving cell and the frame relative offset is a value obtained by the frame offset between the primary and secondary serving cells of the UE mod the length of the HS-PDSCH subframe, or the frame timing of the secondary serving cell is earlier than that of the primary serving cell and the frame relative offset is the length of one HS-PDSCH subframe−(the frame offset between the primary and secondary serving cells of the UE mod the length of one HS-PDSCH subframe), the transmission delay values of the HS-SCCH and the HS-PDSCH being: (the length of one HS-PDSCH subframe−the frame relative offset between the primary and secondary serving cells)−((the length of one HS-PDSCH subframe−the frame relative offset between the primary and secondary serving cells)mod 256); and when the frame timing of the secondary serving cell is earlier than that of the primary serving cell and the frame relative offset is a value obtained by the frame offset between the primary and secondary serving cells of the UE mod the length of the HS-PDSCH subframe, or the frame timing of the secondary serving cell is later than that of the primary serving cell and the frame relative offset is the length of one HS-PDSCH subframe−(the frame offset between the primary and secondary serving cells of the UE mod the length of one HS-PDSCH subframe), the transmission delay values of the HS-SCCH and the HS-PDSCH being: the frame relative offset between the primary and secondary serving cells−the frame relative offset between the primary and secondary serving cells mod 256.

Alternatively, the specified range includes 256 chips.

Alternatively, when adjusting a time when the HS-SCCH and the HS-PDSCH are transmitted to the UE, the transmission delay values of the HS-SCCH and the HS-PDSCH are multiples of 256 chips.

Alternatively, the method further comprises:

the base station to which the secondary serving cell belongs obtaining the frame offset information by the following mode:

the UE measuring the frame timing information of the primary and secondary serving cells, calculating and obtaining frame offset information according to the frame timing information, and reporting the frame offset information to a radio network controller, and the radio network controller transmitting the frame offset information to the base station to which the secondary serving cell belongs.

Alternatively, the method further comprises:

the base station to which the secondary serving cell belongs obtaining the frame offset information by the following mode:

the UE measuring and obtaining the frame timing information of the primary and secondary serving cells, and transmitting the frame timing information to a radio network controller; and the radio network controller obtaining the frame offset information according to the frame timing information, and transmitting the frame offset information to the base station to which the secondary serving cell belongs.

Alternatively, the method further comprises:

the base station to which the secondary serving cell belongs obtaining the frame offset information by the following mode:

the UE measuring and obtaining the frame timing information of the primary and secondary serving cells, and transmitting the frame timing information to a radio network controller;

the radio network controller transmitting the frame timing information to the base station to which the secondary serving cell belongs; and the base station to which the secondary serving cell belongs obtaining the frame offset information according to the frame timing information.

A base station, comprises: a frame offset information obtaining unit and an adjusting unit, wherein, the frame offset information obtaining unit is configured to obtain frame offset information of primary and secondary serving cells of a multi-point transmission User Equipment (UE) when the base station is used as a base station to which the secondary serving cell of the UE belongs; and the adjusting unit is configured to adjust a time when a High Speed Shared Control Channel (HS-SCCH) and a High Speed Dedicated Physical Control Channel (HS-PDSCH) are transmitted to the UE according to frame offset information, so that a subframe boundary offset between the HS-PDSCHs of the primary and secondary serving cells received by the UE is within a specified range, and a subframe boundary offset between the HS-SCCHs of the primary and secondary serving cells received by the UE is within the same specified range.

Alternatively, the frame offset information obtained by the frame offset information obtaining unit includes a frame offset between the primary and secondary serving cells; and the frame offset between the primary and secondary serving cells is a time difference value between even frames of the P-CCPCHs of the primary and secondary serving cells received by the UE; or a time difference value between odd frames of the P-CCPCHs of the primary and secondary serving cells received by the UE.

Alternatively, the adjusting unit is configured to adjust the time when the HS-SCCH and the HS-PDSCH are transmitted to the UE according to the frame offset information by the following mode:

obtaining transmission delay values of the HS-SCCH and the HS-PDSCH:

when a frame timing of the secondary serving cell is later than that of the primary serving cell, the transmission delay values of the HS-SCCH and the HS-PDSCH being: (a length of one HS-PDSCH subframe–frame offset between the primary and secondary serving cells of the UE mod a length of the HS-PDSCH subframe)–((the length of one HS-PDSCH subframe–the frame offset between the primary and secondary serving cells of the UE mod the length of the HS-PDSCH subframe)mod 256); and when the frame timing of the secondary serving cell is earlier than that of the primary serving cell, the transmission delay values of the HS-SCCH and the HS-PDSCH being: the frame offset between the primary and secondary serving cells of the UE mod the length of the HS-PDSCH subframe–((the frame offset between the primary and secondary serving cells of the UE mod the length of the HS-PDSCH subframe)mod 256).

Alternatively, the frame offset information obtained by the frame offset information obtaining unit includes a frame relative offset;

the frame relative offset is a value obtained by the frame offset between the primary and secondary serving cells of the UE mod the length of the HS-PDSCH subframe; or is the length of one HS-PDSCH subframe–(the frame offset between the primary and secondary serving cells of the UE mod the length of one HS-PDSCH subframe);

the frame offset between the primary and secondary serving cells is a time difference value between even frames of the P-CCPCHs of the primary and secondary serving cells received by the UE; or is a time difference value between odd frames of the P-CCPCHs of the primary and secondary serving cells received by the UE.

Alternatively, the adjusting unit is configured to adjust the time when the HS-SCCH and the HS-PDSCH are transmitted to the UE according to the frame offset information by the following mode:

obtaining the transmission delay values of the HS-SCCH and the HS-PDSCH:

when the frame timing of the secondary serving cell is later than that of the primary serving cell and the frame relative offset is a value obtained by the frame offset between the primary and secondary serving cells of the UE mod the length of the HS-PDSCH subframe, the transmission delay values of the HS-SCCH and the HS-PDSCH being: (the length of one HS-PDSCH subframe–the frame relative offset between the primary and secondary serving cells)–((the length of one HS-PDSCH subframe–the frame relative offset between the primary and secondary serving cells)mod 256);

when the frame timing of the secondary serving cell is earlier than that of the primary serving cell and the frame relative offset is a value obtained by the frame offset between the primary and secondary serving cells of the UE mod the length of the HS-PDSCH subframe, the transmission delay values of the HS-SCCH and the HS-PDSCH being: the frame relative offset between the primary and secondary serving cells–the frame relative offset between the primary and secondary serving cells mod 256;

when the frame timing of the secondary serving cell is later than that of the primary serving cell and the frame relative offset is the length of one HS-PDSCH subframe–(the frame offset between the primary and secondary serving cells of the UE mod the length of one HS-PDSCH subframe), the transmission delay values of the HS-SCCH and the HS-PDSCH being: the frame relative offset between the primary and secondary serving cells–the frame relative offset between the primary and secondary serving cells mod 256; and when the frame timing of the secondary serving cell is earlier than that of the primary serving cell and the frame relative offset is the length of one HS-PDSCH subframe–(the frame offset between the primary and secondary serving cells of the UE mod the length of one HS-PDSCH subframe), the transmission delay values of the HS-SCCH and the HS-PDSCH being: (the length of one HS-PDSCH subframe–the frame relative offset between the primary and secondary serving cells)–((the length of one HS-PDSCH subframe–the frame relative offset between the primary and secondary serving cells)mod 256).

Alternatively, the specified range includes 256 chips.

Alternatively, when the adjusting unit adjusts a time when the HS-SCCH and the HS-PDSCH are transmitted to the UE according to the frame offset information, the transmission delay values of the HS-SCCH and the HS-PDSCH are multiples of 256 chips.

Alternatively, the frame offset information obtaining unit is configured to obtain the frame offset information by the following mode:

receiving the frame offset information transmitted by a radio network controller; or receiving the frame timing information of primary and secondary serving cells of the UE transmitted by the radio network controller, and obtaining the frame offset information according to the frame timing information.

A multi-point transmission system, comprises any base station as described above and a radio network controller, wherein, the radio network controller is configured to receive frame timing information of primary and secondary serving cells of a UE reported by the UE, calculate frame offset information according to the frame timing information, transmit the frame offset information to the base station to which the secondary serving cell belongs; or receive the frame offset information reported by the UE, and transmit the frame offset information to the base station to which the secondary serving cell belongs.

A terminal, is configured to measure frame timing information of primary and secondary serving cells of the terminal in a multi-point transmission network, report the frame timing information to a radio network controller, or measure the frame timing information of the primary and secondary serving cells of the terminal, obtain frame offset information according to the frame timing information, and report the frame offset information to the radio network controller.

The embodiments of the present document implement synchronization of the HS-SCCH and the HS-PDSCH transmitted by the primary and secondary cells to the UE, and reduce the complexity of the design of the network system and the terminal, especially reduce the implementation cost of the network system and the terminal.

PREFERRED EMBODIMENTS OF THE INVENTION

In order to make purposes, technical schemes and advantages of the present document more apparent and clear, the embodiments of the present document will be described in detail hereinafter in conjunction with accompanying drawings. It should be illustrated that, in the case of no conflict, the embodiments in the present application and the features in the embodiments can be combined with each other randomly.

For a UE enabling multi-point transmission, a base station to which a secondary serving cell of the UE belongs adjusting the time when a HS-SCCH and a HS-PDSCH are transmitted to the UE according to frame offset information of primary and secondary serving cells of the UE, so that a subframe boundary offset between the HS-PDSCHs of the primary and secondary serving cells received by the UE is within a specified range, and a subframe boundary offset between the HS-SCCHs of the primary and secondary serving cells received by the UE is within the same specified range.

Wherein, the subframe boundary offset between the HS-PDSCHs of the primary and secondary serving cells refers to a time difference value between starting points of the HS-PDSCH subframes of the primary and secondary serving cells received by the UE; and the subframe boundary offset between the HS-SCCHs of the primary and secondary serving cells refers to a time difference value between starting points of the HS-SCCH subframes of the primary and secondary serving cells received by the UE.

Figure 1:
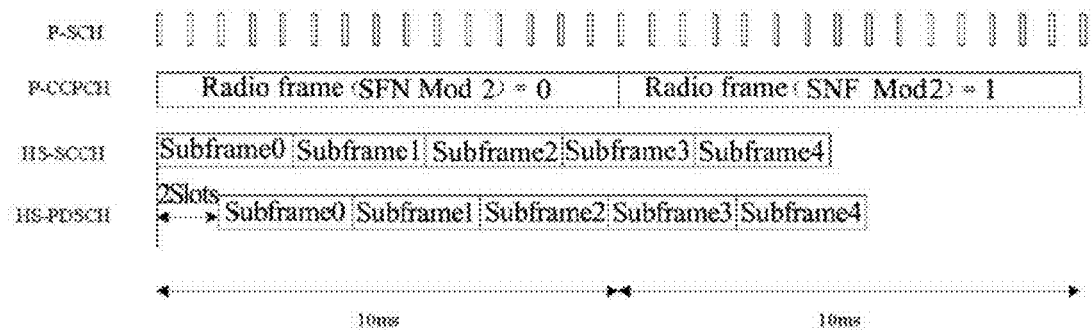
FIG. 1 is a timing diagram of HSDPA related channel specified in the 3GPP protocol.
Figure 2:
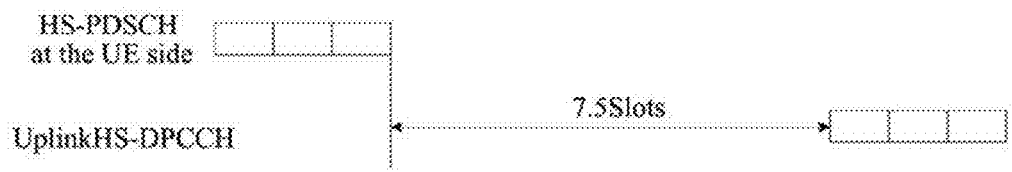
FIG. 2 is a timing diagram of the HS-DPCCH and the HS-PDSCH specified in the 3GPP protocol.
Figure 3:
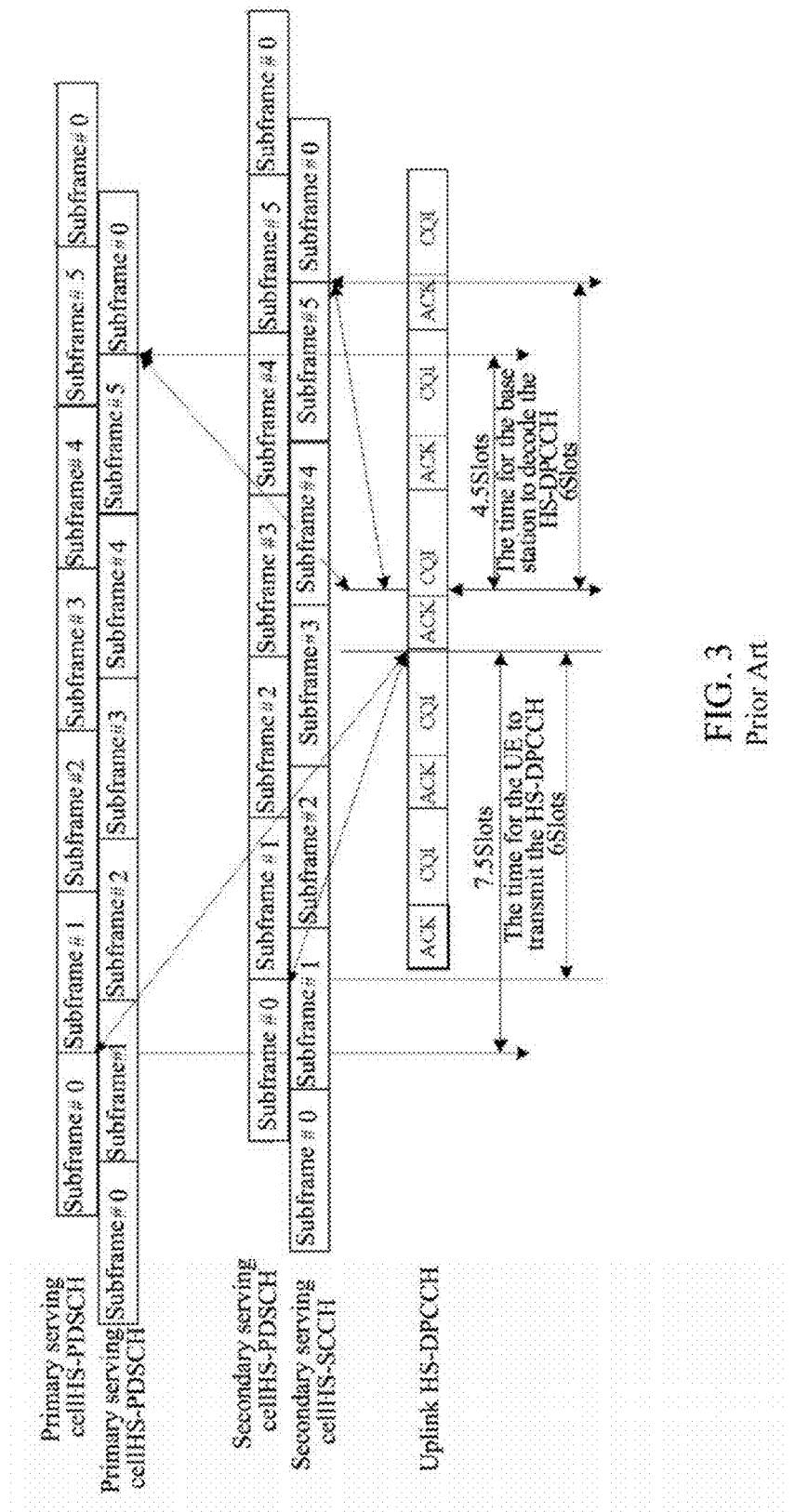
FIG. 3 is a diagram of a first solution.
Figure 4:
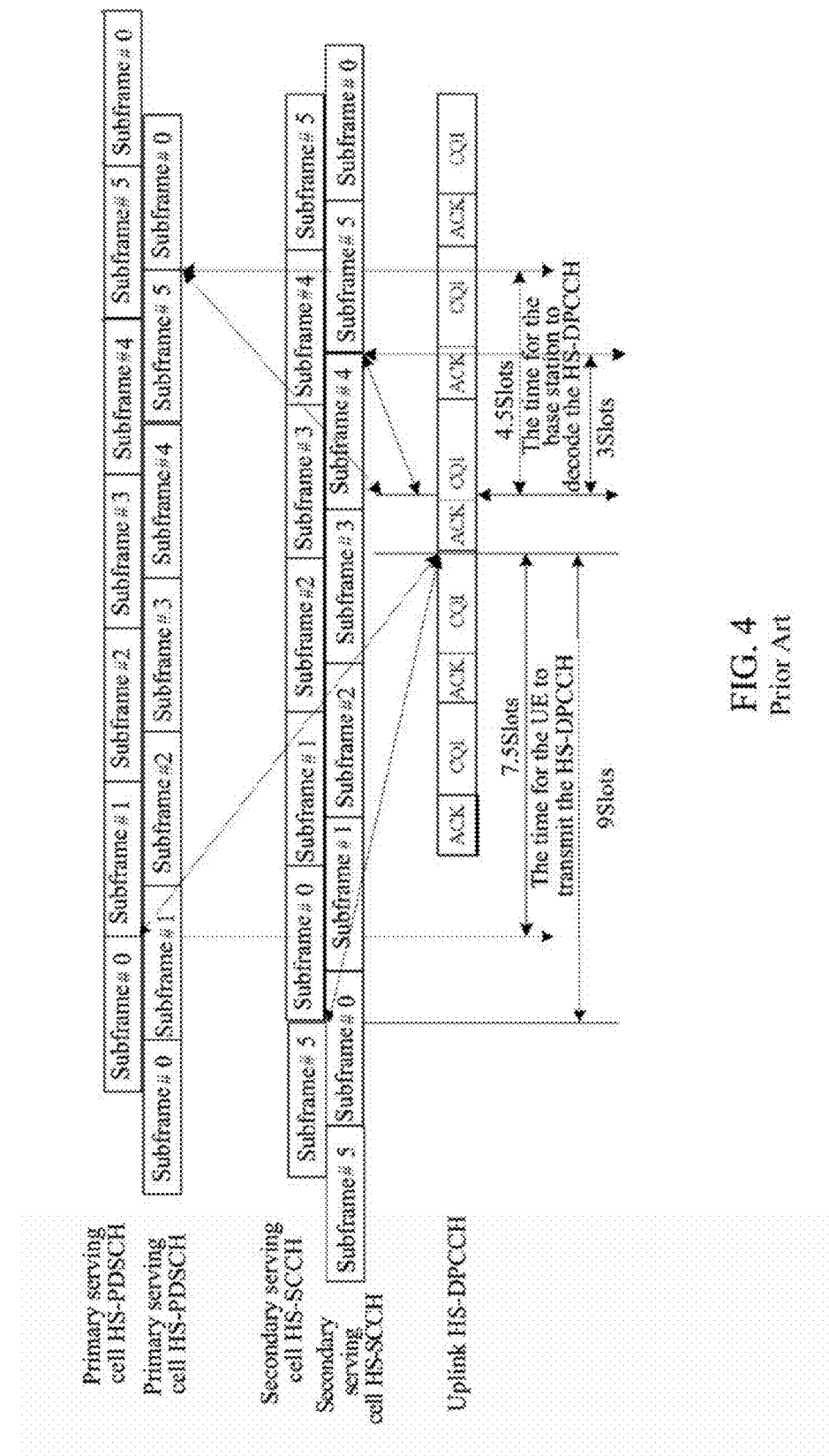
FIG. 4 is a diagram of a second solution.
Figure 5:
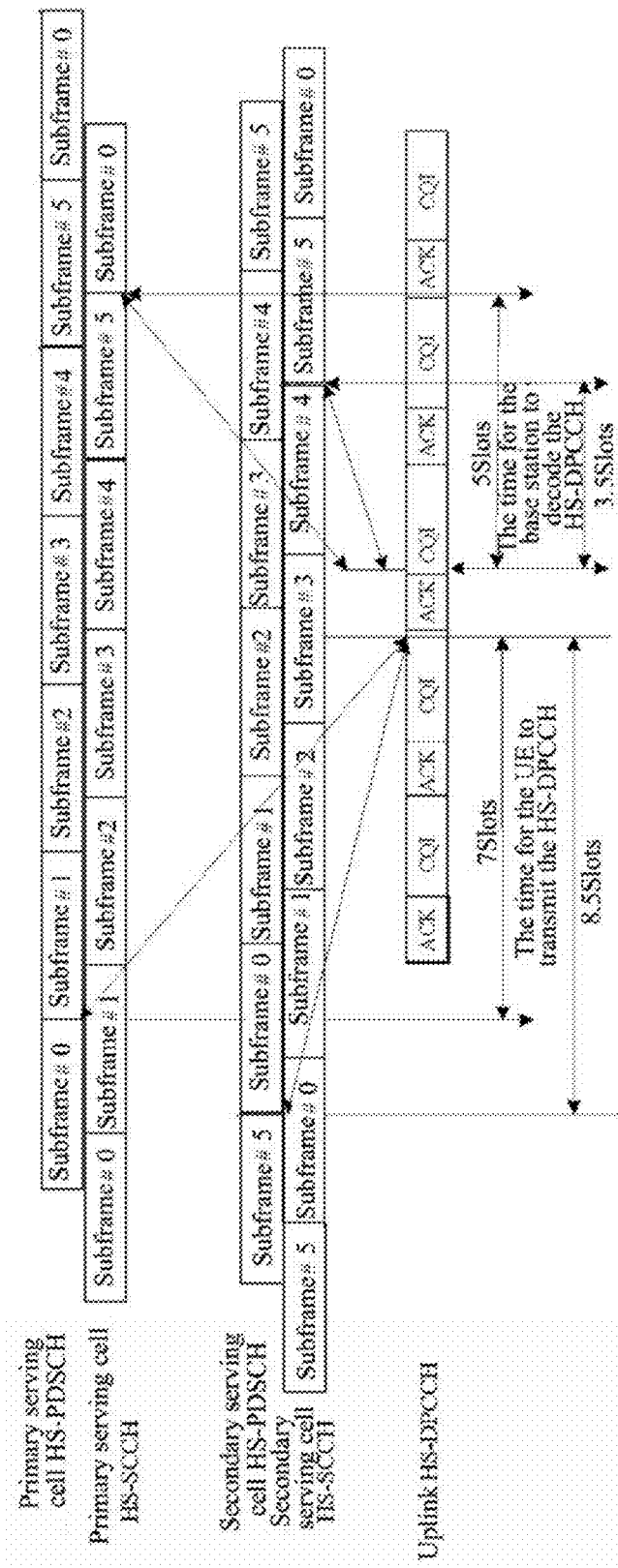
FIG. 5 is a diagram of a third solution.
Figure 6:
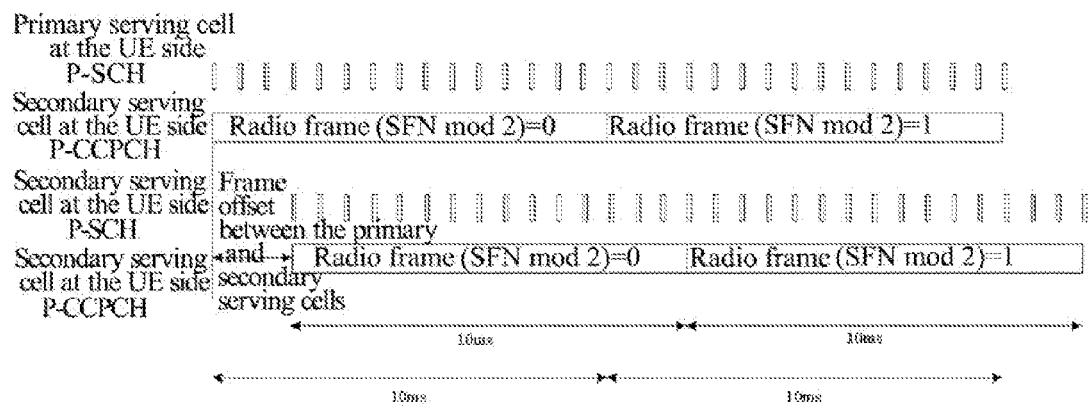
FIG. 6 is a diagram of a frame offset between primary and secondary serving cells according to an embodiment of the present document.

The frame offset information includes a frame offset between the primary and secondary serving cells;

the frame offset between the primary and slave serving cells is a time difference value between even frames of the P-CCPCHs of the primary and secondary serving cells received by the UE; or a time difference value between odd frames of the P-CCPCHs of the primary and secondary serving cells received by the UE, as shown in FIG. 6. Of course, it can also be determined by the time difference value between other channel frames, for example, Primary Synchronization Channel (P-SCH) frames, which is only used as an example here. The frame offset can be determined by the frame timing information measured and obtained by the UE.

Said adjusting the time when an HS-SCCH and an HS-PDSCH are transmitted comprises: obtaining the transmission delay value of the HS-SCCH and the transmission delay value of the HS-PDSCH:

when the frame timing of the secondary serving cell is later than that of the primary serving cell, the transmission delay values of the HS-SCCH and the HS-PDSCH are: (the length of one HS-PDSCH subframe–frame offset between the primary and secondary serving cells of the UE mod the length of the HS-PDSCH subframe)–((the length of one HS-PDSCH subframe–frame offset between the primary and secondary serving cells of the UE mod the length of the HS-PDSCH subframe)mod 256); and when the frame timing of the secondary serving cell is earlier than that of the primary serving cell, the transmission delay values of the HS-SCCH and the HS-PDSCH are: the frame offset between the primary and secondary serving cells of the UE mod the length of the HS-PDSCH subframe–((the frame offset between the primary and secondary serving cells of the UE mod the length of the HS-PDSCH subframe)mod 256).

The frame offset information includes a frame relative offset;

the frame relative offset is a value obtained by the frame offset between the primary and secondary serving cells of the UE mod the length of the HS-PDSCH subframe; or the frame relative offset is the length of one HS-PDSCH subframe–(the frame offset between the primary and secondary serving cells of the UE mod the length of one HS-PDSCH subframe);

the frame offset between the primary and secondary serving cells is a time difference value between even frames of the P-CCPCHs of the primary and secondary serving cells received by the UE; or is a time difference value between odd frames of the P-CCPCHs of the primary and secondary serving cells received by the UE.

Figure 7:
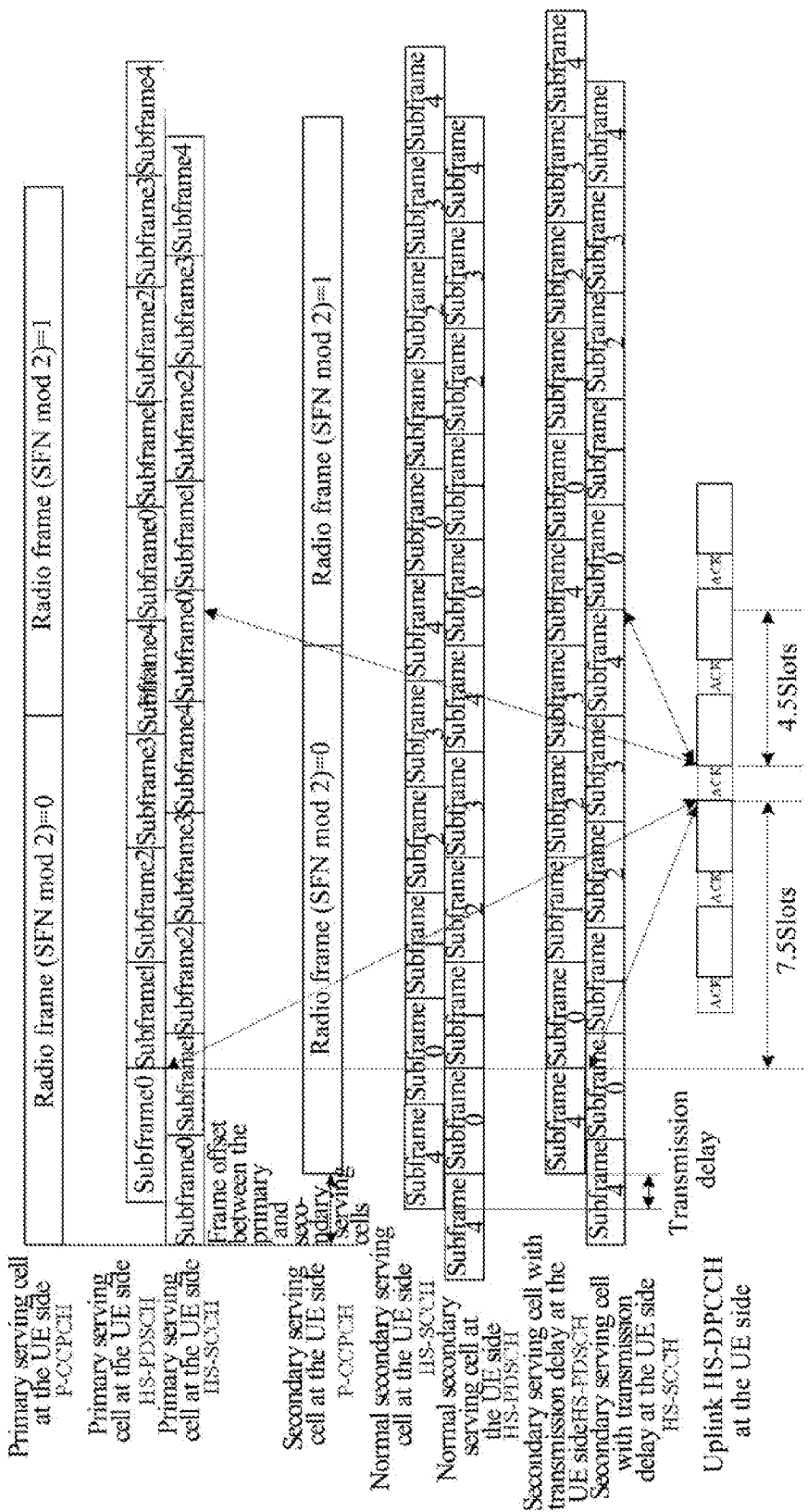
FIG. 7 is a diagram of a solution according to an embodiment of the present document.

As shown in FIG. 7, determining the transmission delay values of the HS-SCCH and the HS-PDSCH according to the frame relative offset comprises:

when the frame timing of the secondary serving cell is later than that of the primary serving cell and the frame relative offset is a value obtained by the frame offset between the primary and secondary serving cells of the UE mod the length of the HS-PDSCH subframe, the transmission delay values of the HS-SCCH and the HS-PDSCH are: (the length of one HS-PDSCH subframe–the frame relative offset between the primary and secondary serving cells)–((the length of one HS-PDSCH subframe–the frame relative offset between the primary and secondary serving cells)mod 256);

when the frame timing of the secondary serving cell is earlier than that of the primary serving cell and the frame relative offset is a value obtained by the frame offset between the primary and secondary serving cells of the UE mod the length of the HS-PDSCH subframe, the transmission delay values of the HS-SCCH and the HS-PDSCH are: the frame relative offset between the primary and secondary serving cells–the frame relative offset between the primary and secondary serving cells mod 256;

when the frame timing of the secondary serving cell is later than that of the primary serving cell and the frame relative offset is the length of one HS-PDSCH subframe–(the frame offset between the primary and secondary serving cells of the UE mod the length of one HS-PDSCH subframe), the transmission delay values of the HS-SCCH and the HS-PDSCH are: the frame relative offset between the primary and secondary serving cells–the frame relative offset between the primary and secondary serving cells mod 256; and when the frame timing of the secondary serving cell is earlier than that of the primary serving cell and the frame relative offset is the length of one HS-PDSCH subframe–(the frame offset between the primary and secondary serving cells of the UE mod the length of one HS-PDSCH subframe), the transmission delay values of the HS-SCCH and the HS-PDSCH are: (the length of one HS-PDSCH subframe–the frame relative offset between the primary and secondary serving cells)–((the length of one HS-PDSCH subframe–the frame relative offset between the primary and secondary serving cells)mod 256).

In practical applications, it can be pre-specified that when the frame timing of the secondary serving cell is later than that of the primary serving cell, the frame relative offset is a value obtained by the frame offset between the primary and secondary serving cells of the UE mod the length of the HS-PDSCH subframe, and when the frame timing of the secondary serving cell is earlier than that of the primary serving cell, the frame relative offset is the length of one HS-PDSCH subframe−(the frame offset between the primary and secondary serving cells of the UE mod the length of one HS-PDSCH subframe), then the transmission delay values of the HS-SCCH and the HS-PDSCH are: (the length of one HS-PDSCH subframe−the frame relative offset between the primary and secondary serving cells)−((the length of one HS-PDSCH subframe−the frame relative offset between the primary and secondary serving cells)mod 256); and alternatively, it is pre-specified that when the frame timing of the secondary serving cell is earlier than that of the primary serving cell, the frame relative offset is a value obtained by the frame offset between the primary and secondary serving cells of the UE mod the length of the HS-PDSCH subframe, and when the frame timing of the secondary serving cell is later than that of the primary serving cell, the frame relative offset is the length of one HS-PDSCH subframe−(the frame offset between the primary and secondary serving cells of the UE mod the length of one HS-PDSCH subframe), then the transmission delay values of the HS-SCCH and the HS-PDSCH are: the frame relative offset between the primary and secondary serving cells−the frame relative offset between the primary and secondary serving cells mod 256.

When determining the transmission delay value as described above, mod 256 is mainly used to ensure that the transmission delay values are multiples of 256 chips, and if set to multiples of other preset values as required, mod the preset value is calculated correspondingly.

In the present system, the length of one HS-PDSCH subframe is 7680 chips.

Alternatively, if the frame relative offset is larger than 256 chips and less than 7424 chips, the secondary serving cell needs to delay the transmission of the HS-PDSCH and HS-SCCH subframes of the UE; otherwise, the time when the HS-PDSCH and the HS-SCCH are transmitted is remain unchanged.

Alternatively, when adjusting the time when the HS-PDSCH and the HS-SCCH are transmitted, the transmission delay values of the HS-SCCH and the HS-PDSCH are multiples of 256 chips. Other values can also be set as required.

Alternatively, the specified range includes 256 chips. Other values can also be set as required.

Alternatively, the base station to which the secondary serving cell belongs obtains the frame offset information by the following mode:

the UE measuring and obtaining the frame timing information of the primary and secondary serving cells, and transmitting the frame timing information to a radio network controller; and the radio network controller obtaining the frame offset information according to the frame timing information, and transmitting the frame offset information to the base station to which the secondary serving cell belongs.

Alternatively, the base station to which the secondary serving cell belongs obtains the frame offset information by the following mode:

the UE measuring the frame timing information of the primary and secondary serving cells, calculating and obtaining frame offset information according to the frame timing information, and reporting the frame offset information to a radio network controller, and the radio network controller transmitting the frame offset information to the base station to which the secondary serving cell belongs.

Alternatively, the base station to which the secondary serving cell belongs obtains the frame offset information by the following mode:

the UE measuring and obtaining the frame timing information of the primary and secondary serving cells, and transmitting the frame timing information to a radio network controller;

the radio network controller transmitting the frame timing information to the base station to which the secondary serving cell belongs; and the base station to which the secondary serving cell belongs obtaining the frame offset information according to the frame timing information.

In the embodiments of the present document, in the multi-point transmission network system, the time when the multi-point transmission UE is started to transmit the HS-PDCCH channel takes the time when the HS-PDSCH of the primary serving cell is received as the basis, and according to the specifications of the existing protocol, the UE begins to transmit the HS-DPCCH channel after about 7.5 slots after the UE receives the HS-PDSCH of the primary serving cell. In order to enable the ACK/NACK of the secondary serving cell to be transmitted at the same time as the primary serving cell, if the frame relative offset between the secondary serving cell and the primary serving cell is larger than 256 chips and less than 7424 chips, the secondary serving cell needs to delay the transmission of the HS-PDSCH and the HS-SCCH channels of the multi-point transmission user, and in order to ensure the orthogonality of the HS-PDSCH channel, the secondary serving cell takes 256 chips as a step for the transmission delay of the HS-PDSCH and HS-SCCH of the multi-point transmission user, and the largest transmission delay is less than 2 ms (the length of one HS-PDSCH subframe). The adjustment amount made by the secondary serving cell against the time when the HS-PDSCH and HS-SCCH subframes of the multi-point transmission user are transmitted is related to the frame relative offset between the primary and secondary serving cells, and specific adjustment amount is to make a boundary offset between the HS-PDSCH and HS-SCCH subframes of the multi-point transmission user be within 256 chips. The frame relative offset between the primary and secondary serving cells can be measured, calculated and obtained at the UE side, or can also be measured at the UE side and then calculated and obtained by the RNC (Radio Network Controller), or can also be measured at the UE side and then calculated and obtained in the secondary serving cell.

The implementation of the technical schemes will be further described in detail in conjunction with accompanying drawings below.

Figure 8:
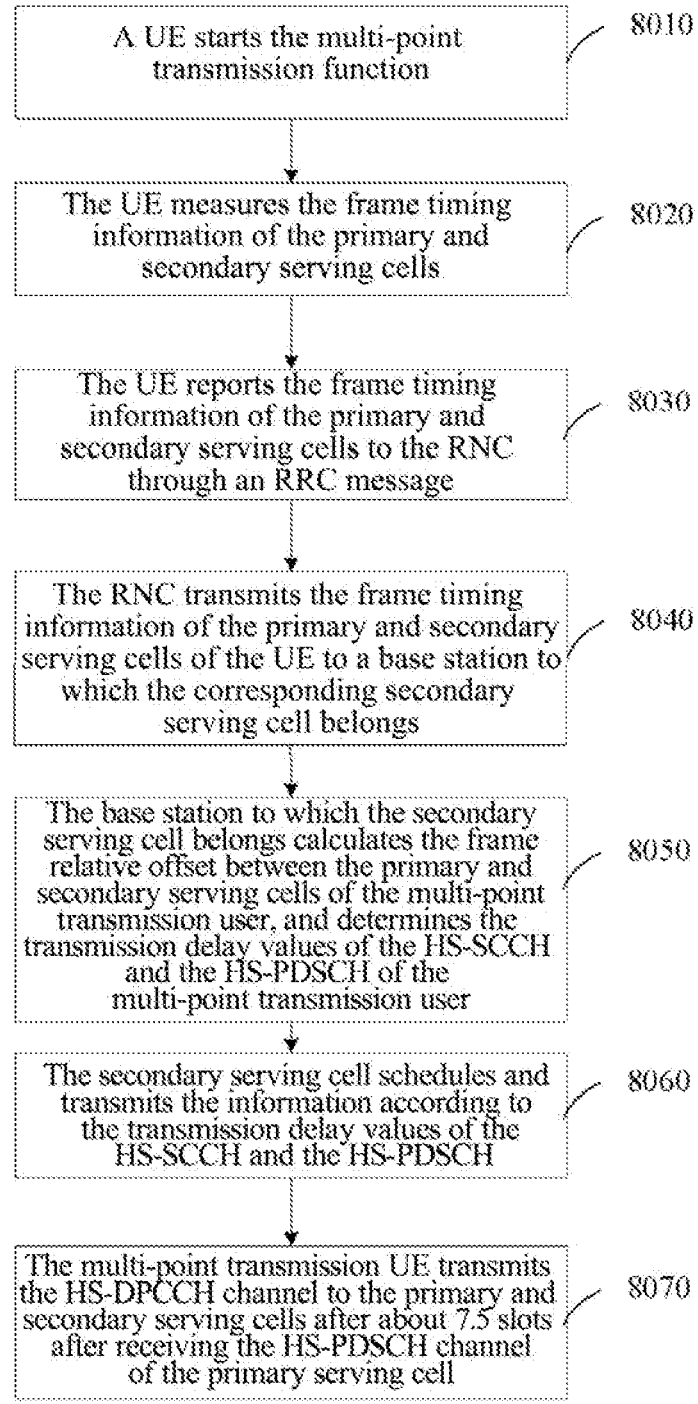
FIG. 8 is a flowchart of embodiment one of the present document.

FIG. 8 is a flowchart of embodiment one of the present document, and the steps of the flow included in the present embodiment are as follows.

In step 8010, a UE starts the multi-point transmission function; in step 8020, the UE measures the frame timing information of the primary and secondary serving cells;

in step 8030, the UE reports the frame timing information of the primary and secondary serving cells to the RNC through an RRC message;

in step 8040, the RNC transmits the frame timing information of the primary and secondary serving cells of the user to a base station to which the corresponding secondary serving cell belongs;

in step 8050, the base station to which the secondary serving cell belongs calculates the frame relative offset between the primary and secondary serving cells of the multi-point transmission user according to the frame timing information, and determines the transmission delay values of the HS-SCCH and the HS-PDSCH of the multi-point transmission user;

in step 8060, the secondary serving cell schedules and transmits the information according to the transmission delay values of the HS-SCCH and the HS-PDSCH; and In step 8070, the multi-point transmission UE transmits the HS-DPCCH channel to the primary and secondary serving cells after about 7.5 slots after receiving the HS-PDSCH channel of the primary serving cell, wherein, the HS-DPCCH channel includes the ACK/NACK indication of the primary and secondary serving cells.

Figure 9:
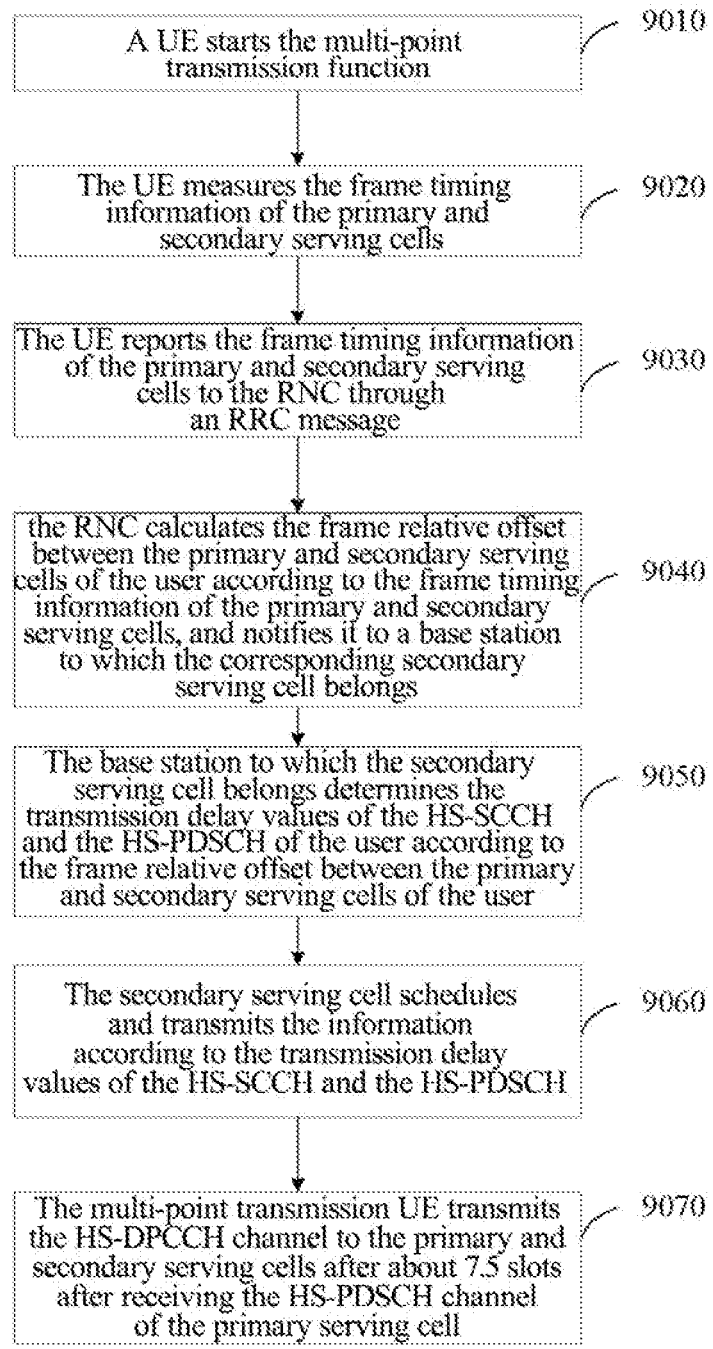
FIG. 9 is a flowchart of embodiment two of the present document.

FIG. 9 is a flowchart of embodiment two of the present document, and the steps of the flow included in the present embodiment are as follows.

In step 9010, a UE starts the multi-point transmission function; in step 9020, the UE measures the frame timing information of the primary and secondary serving cells;

in step 9030, the UE reports the frame timing information of the primary and secondary serving cells to the RNC through an RRC message;

in step 9040, the RNC calculates the frame relative offset between the primary and secondary serving cells of the user according to the frame timing information of the primary and secondary serving cells, and notifies it to a base station to which the corresponding secondary serving cell belongs;

in step 9050, the base station to which the secondary serving cell belongs determines the transmission delay values of the HS-SCCH and the HS-PDSCH of the user according to the frame relative offset between the primary and secondary serving cells of the user;

in step 9060, the secondary serving cell schedules and transmits the information according to the transmission delay values of the HS-SCCH and the HS-PDSCH; and in step 9070, the multi-point transmission UE transmits the HS-DPCCH channel to the primary and secondary serving cells after about 7.5 slots after receiving the HS-PDSCH channel of the primary serving cell, wherein, the HS-DPCCH channel includes the ACK/NACK indication of the primary and secondary serving cells.

Figure 10:
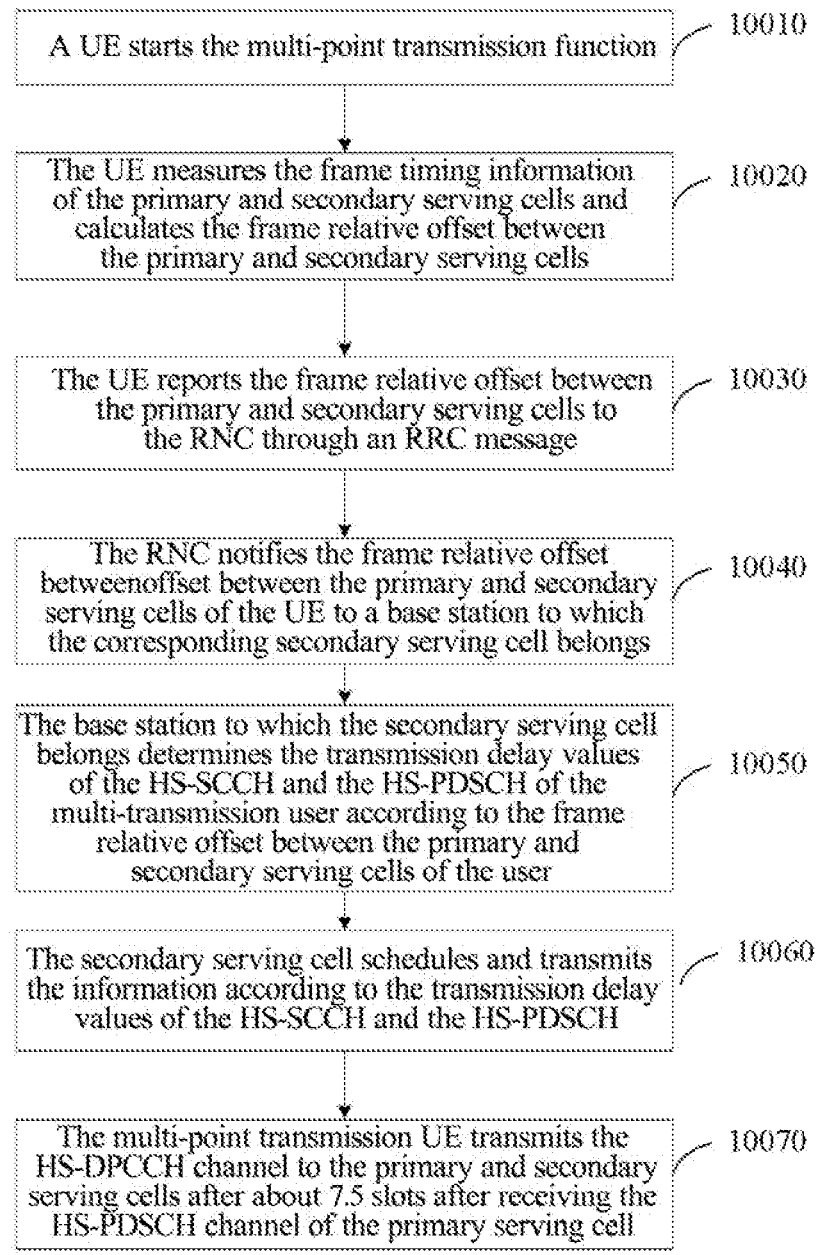
FIG. 10 is a flowchart of embodiment three of the present document.

FIG. 10 is a flowchart of embodiment three of the present document, and the steps of the flow included in the present embodiment are as follows.

In step 10010, a UE starts the multi-point transmission function;

in step 10020, the UE measures the frame timing information of the primary and secondary serving cells and calculates the frame relative offset between the primary and secondary serving cells;

in step 10030, the UE reports the frame relative offset between the primary and secondary serving cells to the RNC through a RRC message;

in step 10040, the RNC notifies the frame relative offset between the primary and secondary serving cells of the user to a base station to which the corresponding secondary serving cell belongs;

in step 10050, the base station to which the secondary serving cell belongs determines the transmission delay values of the HS-SCCH and the HS-PDSCH of the user according to the frame relative offset between the primary and secondary serving cells of the user;

in step 10060, the secondary serving cell schedules and transmits the information according to the transmission delay values of the HS-SCCH and the HS-PDSCH; and in step 10070, the multi-point transmission UE transmits the HS-DPCCH channel to the primary and secondary serving cells after about 7.5 slots after receiving the HS-PDSCH channel of the primary serving cell, wherein, the HS-DPCCH channel includes the ACK/NACK indication of the primary and secondary serving cells.

Figure 11:
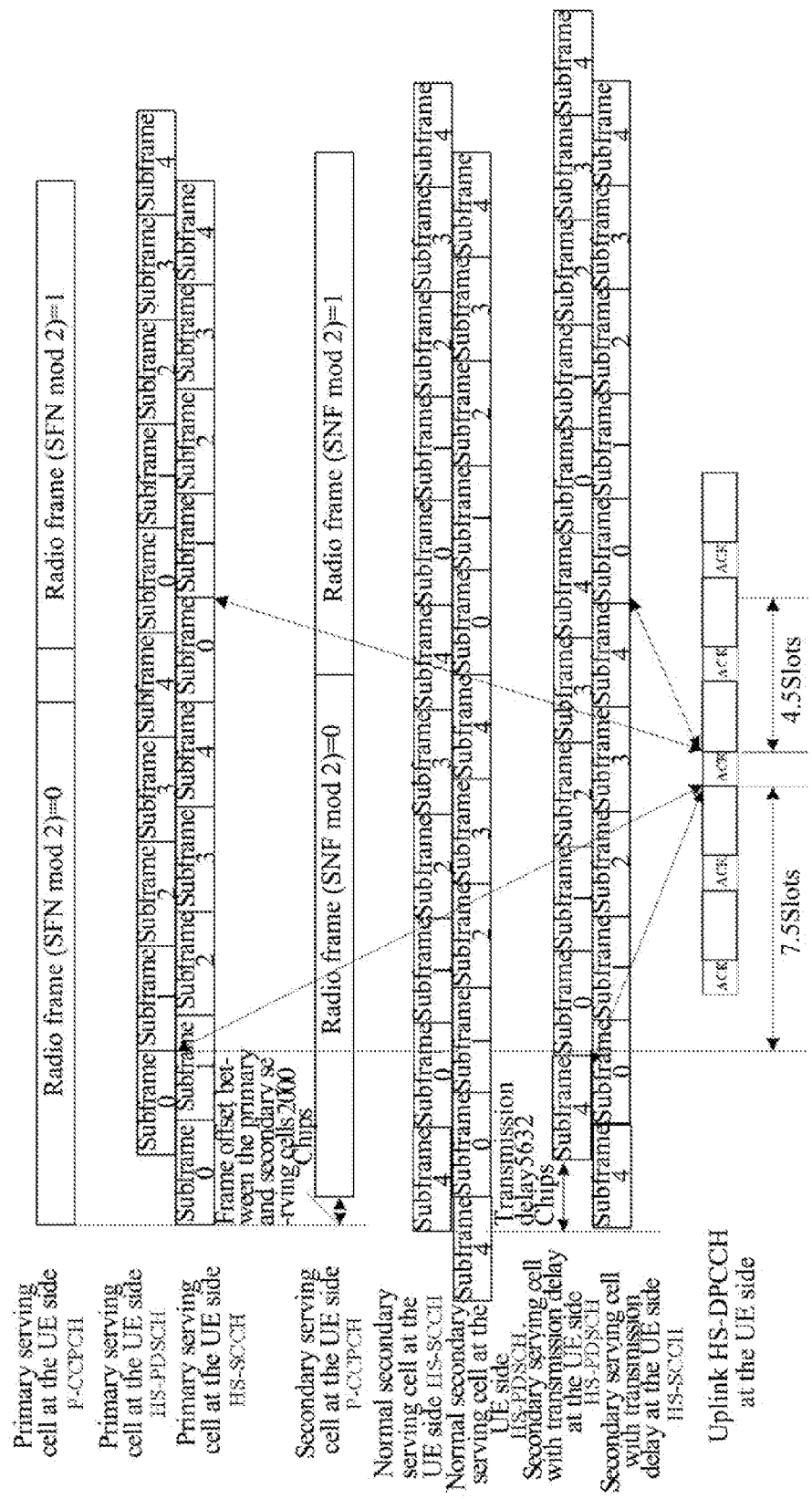
FIG. 11 is a diagram of a delay according to an embodiment of the present document.

FIG. 11 is a diagram of delay according to an embodiment of the present document, and the steps of the flow included in the present embodiment are as follows.

In step 11010, a UE starts the multi-point transmission function;

in step 11020, the frame relative offset between the primary and secondary serving cells is obtained according to a measurement report of the UE, which is 2000 chips, and the frame timing of the secondary serving cell is later than that of the primary serving cell;

at this time, the frame relative offset is a value obtained by the frame offset between the primary and secondary serving cells of the UE mod the length of the HS-PDSCH subframe; the frame offset between the primary and secondary serving cells is a time difference value between even frames of the P-CCPCHs of the primary and secondary serving cells received by the UE; or a time difference value between odd frames of the P-CCPCHs of the primary and secondary serving cells received by the UE.

In step 11030, according to frame offset and the timing relation between the primary and slave serving cells, the transmission delay of the HS-SCCH and the HS-PDSCH of the secondary serving cell of the corresponding multi-point transmission user is calculated and obtained, which is (7680−2000)−((7680−2000)mod 256)=5632 chips; and in step 11040, the secondary serving cell schedules and transmits the information according to the transmission delay values of the HS-SCCH and the HS-PDSCH.

Figure 12:
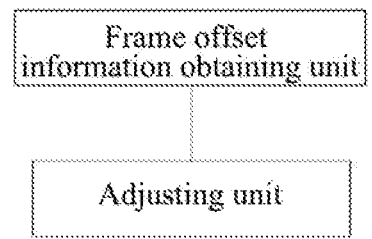
FIG. 12 is a block diagram of a base station according to an embodiment of the present document.

The embodiments of the present document further provide a base station, as shown in FIG. 12, comprising: a frame offset information obtaining unit and an adjusting unit, wherein, the frame offset information obtaining unit is configured to obtain frame offset information of primary and secondary serving cells of a multi-point transmission UE when the base station is used as a base station to which the secondary serving cell of the UE belongs; and the adjusting unit is configured to adjust a time when an HS-SCCH and an HS-PDSCH are transmitted to the UE according to frame offset information, so that a subframe boundary offset between the HS-PDSCHs of the primary and secondary serving cells received by the UE is within a specified range, and a subframe boundary offset between the HS-SCCHs of the primary and secondary serving cells received by the UE is within the same specified range.

The frame offset information obtained by the frame offset information obtaining unit includes the frame offset between the primary and secondary serving cells; and the frame offset between the primary and secondary serving cells is a time difference value between even frames of the P-CCPCHs of the primary and secondary serving cells received by the UE; or a time difference value between odd frames of the P-CCPCHs of the primary and secondary serving cells received by the UE.

The adjusting unit adjusting the time when the HS-SCCH and the HS-PDSCH are transmitted according to the frame offset information comprises: obtaining the transmission delay values of the HS-SCCH and the HS-PDSCH:

when the frame timing of the secondary serving cell is later than that of the primary serving cell, the transmission delay values of the HS-SCCH and the HS-PDSCH being: (a length of one HS-PDSCH subframe−frame offset between the primary and secondary serving cells of the UE mod a length of the HS-PDSCH subframe)−((the length of one HS-PDSCH subframe−frame offset between the primary and secondary serving cells of the UE mod the length of the HS-PDSCH subframe)mod 256); and when the frame timing of the secondary serving cell is earlier than that of the primary serving cell, the transmission delay values of the HS-SCCH and the HS-PDSCH being: the frame offset between the primary and secondary serving cells of the UE mod the length of the HS-PDSCH subframe–((the frame offset between the primary and secondary serving cells of the UE mod the length of the HS-PDSCH subframe)mod 256).

The frame offset information obtained by the frame offset information obtaining unit includes a frame relative offset;

the frame relative offset is a value obtained by the frame offset between the primary and secondary serving cells of the UE mod the length of the HS-PDSCH subframe; or the frame relative offset is the length of one HS-PDSCH subframe–(the frame offset between the primary and secondary serving cells of the UE mod the length of one HS-PDSCH subframe);

the frame offset between the primary and secondary serving cells is a time difference value between even frames of the P-CCPCHs of the primary and secondary serving cells received by the UE; or is a time difference value between odd frames of the P-CCPCHs of the primary and secondary serving cells received by the UE.

The adjusting unit adjusting the time when the HS-SCCH and the HS-PDSCH are transmitted according to the frame offset information comprises: obtaining the transmission delay values of the HS-SCCH and the HS-PDSCH:

when the frame timing of the secondary serving cell is later than that of the primary serving cell and the frame relative offset is a value obtained by the frame offset between the primary and secondary serving cells of the UE mod the length of the HS-PDSCH subframe, the transmission delay values of the HS-SCCH and the HS-PDSCH being: (the length of one HS-PDSCH subframe–the frame relative offset between the primary and secondary serving cells)–((the length of one HS-PDSCH subframe–the frame relative offset between the primary and secondary serving cells)mod 256); and when the frame timing of the secondary serving cell is earlier than that of the primary serving cell and the frame relative offset is a value obtained by the frame offset between the primary and secondary serving cells of the UE mod the length of the HS-PDSCH subframe, the transmission delay values of the HS-SCCH and the HS-PDSCH being: the frame relative offset between the primary and secondary serving cells–the frame relative offset between the primary and secondary serving cells mod 256;

when the frame timing of the secondary serving cell is later than that of the primary serving cell and the frame relative offset is the length of one HS-PDSCH subframe–(the frame offset between the primary and secondary serving cells of the UE mod the length of one HS-PDSCH subframe), the transmission delay values of the HS-SCCH and the HS-PDSCH being: the frame relative offset between the primary and secondary serving cells–the frame relative offset between the primary and secondary serving cells mod 256; and when the frame timing of the secondary serving cell is earlier than that of the primary serving cell and the frame relative offset is the length of one HS-PDSCH subframe–(the frame offset between the primary and secondary serving cells of the UE mod the length of one HS-PDSCH subframe), the transmission delay values of the HS-SCCH and the HS-PDSCH being: (the length of one HS-PDSCH subframe–the frame relative offset between the primary and secondary serving cells)–((the length of one HS-PDSCH subframe–the frame relative offset between the primary and secondary serving cells)mod 256).

Wherein, the specified range includes 256 chips.

When the adjusting unit adjusts a time when the HS-SCCH and the HS-PDSCH are transmitted, the transmission delay values of the HS-SCCH and the HS-PDSCH are multiples of 256 chips.

Wherein, the frame offset information obtaining unit is configured to obtain the frame offset information by the following mode:

receiving the frame offset information transmitted by a radio network controller; or receiving the frame timing information of primary and secondary serving cells of the UE transmitted by the radio network controller, and obtaining the frame offset information according to the frame timing information.

The embodiments of the present document further provide a multi-point transmission system, comprising any base station as described above and a radio network controller, wherein, the radio network controller is configured to receive the frame timing information of the primary and secondary serving cells of a UE reported by the UE, calculate the frame offset information according to the frame timing information, transmit the frame offset information to the base station to which the secondary serving cell belongs; or receive the frame offset information reported by the UE, and transmit the frame offset information to the base station to which the secondary serving cell belongs.

The embodiments of the present document further provide a terminal, configured to measure the frame timing information of the primary and secondary serving cells of the terminal in a multi-point transmission network, report the frame timing information to a radio network controller, or measure the frame timing information of the primary and secondary serving cells of the terminal, obtain frame offset information according to the frame timing information, and report the frame offset information to the radio network controller.

A person having ordinary skill in the art should understand that all or part of the steps in the above method can be implemented by programs instructing related hardware, and the programs can be stored in a computer readable storage medium, such as a read-only memory, a disk, or a disc etc. Alternatively, all or part of the steps in the aforementioned embodiments can also be implemented with one or more integrated circuits. Accordingly, various modules/units in the aforementioned embodiments can be implemented in a form of hardware, or can also be implemented in a form of software functional modules. The present document is not limited to any particular form of combination of hardware and software.

INDUSTRIAL APPLICABILITY

The embodiments of the present document implement synchronization of the HS-SCCH and the HS-PDSCH transmitted by the primary and secondary cells to the UE, and reduce the complexity of the design of the network system and the terminal, especially reduce the implementation cost of the network system and the terminal. Therefore, the invention has strong industrial applicability.

What is claimed is:

1. A method for transmitting data in a multi-point transmission system, comprising:

for a User Equipment (UE) enabling multi-point transmission, a base station to which a secondary serving cell of the UE belongs adjusting a time when a High Speed Shared Control Channel (HS-SCCH) and a High Speed Dedicated Physical Control Channel (HS-PDSCH) are transmitted to the UE according to frame offset information of primary and secondary serving cells of the UE, so that a subframe boundary offset between the HS-PDSCHs of the primary and secondary serving cells received by the UE is within a specified range, and a subframe boundary offset between the HS-SCCHs of the primary and secondary serving cells received by the UE is within the same specified range;

the method further comprising: the base station to which the secondary serving cell belongs obtaining the frame offset information by any one of the following modes:

the UE measuring the frame timing information of the primary and secondary serving cells, calculating and obtaining frame offset information according to the frame timing information, and reporting the frame offset information to a radio network controller, and the radio network controller transmitting the frame offset information to the base station to which the secondary serving cell belongs;

the UE measuring and obtaining the frame timing information of the primary and secondary serving cells, and transmitting the frame timing information to a radio network controller; and the radio network controller obtaining the frame offset information according to the frame timing information, and transmitting the frame offset information to the base station to which the secondary serving cell belongs;

the UE measuring and obtaining the frame timing information of the primary and secondary serving cells, and transmitting the frame timing information to a radio network controller; the radio network controller transmitting the frame timing information to the base station to which the secondary serving cell belongs; and the base station to which the secondary serving cell belongs obtaining the frame offset information according to the frame timing information.

2. The method for transmitting data according to claim 1, wherein, the frame offset information includes a frame offset between the primary and secondary serving cells; and the frame offset between the primary and secondary serving cells is a time difference value between even frames of the Primary Common Control Physical Channels (P-CCPCH) of the primary and secondary serving cells received by the UE; or a time difference value between odd frames of the P-CCPCHs of the primary and secondary serving cells received by the UE.

3. The method for transmitting data according to claim 2, wherein, the step of adjusting a time when an HS-SCCH and an HS-PDSCH are transmitted to the UE comprises:

obtaining transmission delay values of the HS-SCCH and the HS-PDSCH by the following mode:

when a frame timing of the secondary serving cell is later than that of the primary serving cell, the transmission delay values of the HS-SCCH and the HS-PDSCH being: (a length of one HS-PDSCH subframe–the frame offset between the primary and secondary serving cells of the UE mod a length of the HS-PDSCH subframe)–((the length of one HS-PDSCH subframe–the frame offset between the primary and secondary serving cells of the UE mod the length of the HS-PDSCH subframe) mod 256); and when the frame timing of the secondary serving cell is earlier than that of the primary serving cell, the transmission delay values of the HS-SCCH and the HS-PDSCH being: the frame offset between the primary and secondary serving cells of the UE mod the length of the HS-PDSCH subframe–((the frame offset between the primary and secondary serving cells of the UE mod the length of the HS-PDSCH subframe)mod 256).

4. The method for transmitting data according to claim 1, wherein, the frame offset information includes a frame relative offset;

the frame relative offset is a value obtained by the frame offset between the primary and secondary serving cells of the UE mod the length of the HS-PDSCH subframe; or is the length of one HS-PDSCH subframe–(the frame offset between the primary and secondary serving cells of the UE mod the length of one HS-PDSCH subframe);

the frame offset between the primary and secondary serving cells is a time difference value between even frames of the P-CCPCHs of the primary and secondary serving cells received by the UE; or is a time difference value between odd frames of the P-CCPCHs of the primary and secondary serving cells received by the UE.

5. The method for transmitting data according to claim 4, wherein, the step of adjusting a time when an HS-SCCH and an HS-PDSCH are transmitted to the UE comprises:

obtaining the transmission delay values of the HS-SCCH and the HS-PDSCH by the following mode:

when the frame timing of the secondary serving cell is later than that of the primary serving cell and the frame relative offset is a value obtained by the frame offset between the primary and secondary serving cells of the UE mod the length of the HS-PDSCH subframe, or the frame timing of the secondary serving cell is earlier than that of the primary serving cell and the frame relative offset is the length of one HS-PDSCH subframe–(the frame offset between the primary and secondary serving cells of the UE mod the length of one HS-PDSCH subframe), the transmission delay values of the HS-SCCH and the HS-PDSCH being: (the length of one HS-PDSCH subframe–the frame relative offset between the primary and secondary serving cells)–((the length of one HS-PDSCH subframe–the frame relative offset between the primary and secondary serving cells)mod 256); and when the frame timing of the secondary serving cell is earlier than that of the primary serving cell and the frame relative offset is a value obtained by the frame offset between the primary and secondary serving cells of the UE mod the length of the HS-PDSCH subframe, or the frame timing of the secondary serving cell is later than that of the primary serving cell and the frame relative offset is the length of one HS-PDSCH subframe–(the frame offset between the primary and secondary serving cells of the UE mod the length of one HS-PDSCH subframe), the transmission delay values of the HS-SCCH and the HS-PDSCH being: the frame relative offset between the primary and secondary serving cells–the frame relative offset between the primary and secondary serving cells mod 256.

6. The method for transmitting data according to claim 1, wherein, the specified range includes 256 chips.

7. The method for transmitting data according to claim 1, wherein, when adjusting a time when the HS-SCCH and the HS-PDSCH are transmitted to the UE, the transmission delay values of the HS-SCCH and the HS-PDSCH are multiples of 256 chips.

8. A base station, comprising: a frame offset information obtaining unit and an adjusting unit, wherein, the frame offset information obtaining unit is configured to obtain frame offset information of primary and secondary serving cells of a multi-point transmission User Equipment (UE) when the base station is used as a base station to which the secondary serving cell of the UE belongs; and the adjusting unit is configured to adjust a time when a High Speed Shared Control Channel (HS-SCCH) and a High Speed Dedicated Physical Control Channel (HS-PDSCH) are transmitted to the UE according to the frame offset information, so that a subframe boundary offset between the HS-PDSCHs of the primary and secondary serving cells received by the UE is within a specified range, and a subframe boundary offset between the HS-SCCHs of the primary and secondary serving cells received by the UE is within the same specified range;

wherein the frame offset information obtaining unit obtains the frame offset information by any one of the following modes:

the UE measuring the frame timing information of the primary and secondary serving cells, calculating and obtaining frame offset information according to the frame timing information, and reporting the frame offset information to a radio network controller, and the radio network controller transmitting the frame offset information to said base station;

the UE measuring and obtaining the frame timing information of the primary and secondary serving cells, and transmitting the frame timing information to a radio network controller; and the radio network controller obtaining the frame offset information according to the frame timing information, and transmitting the frame offset information to said base station;

the UE measuring and obtaining the frame timing information of the primary and secondary serving cells, and transmitting the frame timing information to a radio network controller; the radio network controller transmitting the frame timing information to said base station; and the frame offset information obtaining unit in said base station obtaining the frame offset information according to the frame timing information.

9. The base station according to claim 8, wherein,
the frame offset information obtained by the frame offset information obtaining unit includes a frame offset between the primary and secondary serving cells; and
the frame offset between the primary and secondary serving cells is a time difference value between even frames of the P-CCPCHs of the primary and secondary serving cells received by the UE; or a time difference value between odd frames of the P-CCPCHs of the primary and secondary serving cells received by the UE.

10. The base station according to claim 9, wherein, the adjusting unit is configured to adjust the time when the HS-SCCH and the HS-PDSCH are transmitted to the UE according to the frame offset information by the following mode:
obtaining transmission delay values of the HS-SCCH and the HS-PDSCH:
when a frame timing of the secondary serving cell is later than that of the primary serving cell, the transmission delay values of the HS-SCCH and the HS-PDSCH being: (a length of one HS-PDSCH subframe−the frame offset between the primary and secondary serving cells of the UE mod a length of the HS-PDSCH subframe)−((the length of one HS-PDSCH subframe−the frame offset between the primary and secondary serving cells of the UE mod the length of the HS-PDSCH subframe) mod 256); and when the frame timing of the secondary serving cell is earlier than that of the primary serving cell, the transmission delay values of the HS-SCCH and the HS-PDSCH being: the frame offset between the primary and secondary serving cells of the UE mod the length of the HS-PDSCH subframe−((the frame offset between the primary and secondary serving cells of the UE mod the length of the HS-PDSCH subframe)mod 256).

11. The base station according to claim 8, wherein,
the frame offset information obtained by the frame offset information obtaining unit includes a frame relative offset;
the frame relative offset is a value obtained by the frame offset between the primary and secondary serving cells of the UE mod the length of the HS-PDSCH subframe; or is the length of one HS-PDSCH subframe−(the frame offset between the primary and secondary serving cells of the UE mod the length of one HS-PDSCH subframe);
the frame offset between the primary and secondary serving cells is a time difference value between even frames of the P-CCPCHs of the primary and secondary serving cells received by the UE; or is a time difference value between odd frames of the P-CCPCHs of the primary and secondary serving cells received by the UE.

12. The base station according to claim 11, wherein, the adjusting unit is configured to adjust the time when the HS-SCCH and the HS-PDSCH are transmitted to the UE according to the frame offset information by the following mode:
obtaining the transmission delay values of the HS-SCCH and the HS-PDSCH:
when the frame timing of the secondary serving cell is later than that of the primary serving cell and the frame relative offset is a value obtained by the frame offset between the primary and secondary serving cells of the UE mod the length of the HS-PDSCH subframe, the transmission delay values of the HS-SCCH and the HS-PDSCH being: (the length of one HS-PDSCH subframe−the frame relative offset between the primary and secondary serving cells)−((the length of one HS-PDSCH subframe−the frame relative offset between the primary and secondary serving cells)mod 256);
when the frame timing of the secondary serving cell is earlier than that of the primary serving cell and the frame relative offset is a value obtained by the frame offset between the primary and secondary serving cells of the UE mod the length of the HS-PDSCH subframe, the transmission delay values of the HS-SCCH and the HS-PDSCH being: the frame relative offset between the primary and secondary serving cells−the frame relative offset between the primary and secondary serving cells mod 256;
when the frame timing of the secondary serving cell is later than that of the primary serving cell and the frame relative offset is the length of one HS-PDSCH subframe−(the frame offset between the primary and secondary serving cells of the UE mod the length of one HS-PDSCH subframe), the transmission delay values of the HS-SCCH and the HS-PDSCH being: the frame relative offset between the primary and secondary serving cells−the frame relative offset between the primary and secondary serving cells mod 256; and
when the frame timing of the secondary serving cell is earlier than that of the primary serving cell and the frame relative offset is the length of one HS-PDSCH subframe−(the frame offset between the primary and secondary serving cells of the UE mod the length of one HS-PDSCH subframe), the transmission delay values of the HS-SCCH and the HS-PDSCH being: (the length of one HS-PDSCH subframe−the frame relative offset between the primary and secondary serving cells)−((the length of one HS-PDSCH subframe−the frame relative offset between the primary and secondary serving cells) mod 256).

13. The base station according to claim 8, wherein, the specified range includes 256 chips.

14. The base station according to claim 8, wherein, when the adjusting unit adjusts a time when the HS-SCCH and the HS-PDSCH are transmitted to the UE according to the frame offset information, the transmission delay values of the HS-SCCH and the HS-PDSCH are multiples of 256 chips.

15. A terminal in a multi-point transmission network, configured to:

measure frame timing information of primary and secondary serving cells of the terminal, calculate and obtain frame offset information according to the frame timing information, and report the frame offset information to a radio network controller; wherein the radio network controller transmits the frame offset information to a base station to which the secondary serving cell belongs; or measure and obtain the frame timing information of the primary and secondary serving cells, and transmit the frame timing information to a radio network controller; wherein the radio network controller obtains the frame offset information according to the frame timing information, and transmits the frame offset information to the base station to which the secondary serving cell belongs; or measure and obtain the frame timing information of the primary and secondary serving cells, and transmit the frame timing information to a radio network controller; wherein the radio network controller transmits the frame timing information to the base station to which the secondary serving cell belongs, and the base station to which the secondary serving cell belongs obtains the frame offset information according to the frame timing information;

wherein the base station to which the secondary serving cell of the UE belongs adjusts a time when a High Speed Shared Control Channel (HS-SCCH) and a High Speed Dedicated Physical Control Channel (HS-PDSCH) are transmitted to the UE according to the frame offset information of the primary and secondary serving cells of the UE, so that a subframe boundary offset between the HS-PDSCHs of the primary and secondary serving cells received by the UE is within a specified range, and a subframe boundary offset between the HS-SCCHs of the primary and secondary serving cells received by the UE is within the same specified range.

* * * * *